United States Patent
Wermelinger

[11] Patent Number: 6,045,640
[45] Date of Patent: Apr. 4, 2000

[54] APPARATUS FOR BUTT WELDING OF ARTICLES MADE OF THERMOPLASTIC MATERIAL

[75] Inventor: Jörg Wermelinger, Schaffhausen, Switzerland

[73] Assignee: Georg Fischer Rohrleitungssysteme AG, Schaffhausen, Switzerland

[21] Appl. No.: 09/112,089

[22] Filed: Jul. 9, 1998

[30] Foreign Application Priority Data

Sep. 1, 1997 [DE] Germany .......................... 197 38 088

[51] Int. Cl.⁷ .............................. B32B 31/20; B29C 65/02
[52] U.S. Cl. .................. 156/64; 156/359; 156/304.6; 156/583.1
[58] Field of Search ................... 156/64, 304.6, 156/359, 378, 304.1, 556, 583.1, 366, 350; 136/230; 374/194, 208

[56] References Cited

U.S. PATENT DOCUMENTS

| | | | |
|---|---|---|---|
| 5,013,376 | 5/1991 | McElroy | 156/64 |
| 5,176,451 | 1/1993 | Sasada | 374/179 |
| 5,522,954 | 6/1996 | Bennett | 156/64 |
| 5,527,406 | 6/1996 | Brath | 156/64 |
| 5,735,264 | 4/1998 | Siczek | 128/653.001 |
| 5,753,835 | 5/1998 | Gustin | 73/866.5 |

*Primary Examiner*—Richard Crispino
*Assistant Examiner*—George R Koch, III
*Attorney, Agent, or Firm*—Bachman & LaPointe, P.C.

[57] ABSTRACT

The invention proposes an apparatus an a method of welding together articles made of a termoplastic material by means of a butt welding method. The articles are held in coaxial relationship by means of a pair of clamping mechanisms. A heating element can be brought between the two articles to heat up their respective facing front faces, whereafter the heating element is removed and the heated front faces brought into mutual contact. For determining the strength of the welding zone, the ambient temperature is considered. For this purpose, a thermal sensor is provided that is arranged at the welding apparatus. The thermal sensor is thermally insulated against the welding apparatus.

14 Claims, 3 Drawing Sheets

APPARATUS FOR BUTT WELDING OF ARTICLES MADE OF THERMOPLASTIC MATERIAL

FIELD OF THE INVENTION

The present invention refers to an apparatus for butt welding of articles made of thermoplastic material. Particularly, the present invention refers to an apparatus of this kind that comprises a suitable means for holding in place in coaxial relationship the two articles to be welded together, a heating means for heating the two articles to be welded together and an electronic control unit for controlling the welding process.

In a second aspect, the present invention refers to a method of butt welding articles made of a thermoplastic material by means of an apparatus comprising a means for holding in place in coaxial relationship two articles to be welded together, a heating means for heating the two articles to be welded together, an electronic control unit, and a temperature sensor means for monitoring the ambient temperature.

BACKGROUND OF THE INVENTION

Such apparatuses and methods are also known under the headword "Heating Element Butt Welding". Thereby, the welding operation is performed in two phases in chronological sequence, i.e. a heating phase and a jointing phase.

Common to most of already known apparatuses for the welding of thermoplastic plastic articles, particularly plastic pipes, is that the jointing pressure is controlled during the cooling period for monitoring the welding operation. This sequence is recorded in a way-pressure-force-time-diagram. Hitherto, it was considered as ensured that a process control monitored in such a way is essential for the quality of the welding.

In numerous investigations, it has been observed that also other influences are essential for a welding of high quality and reproducibility.

PRIOR ART

In the publication WO 95/11124, a butt welding machine for welding together the ends of pipes is disclosed in which the parts to be welded together are held in coaxial relationship by a clamping mechanism. Amongst else, the machine comprises a sensor for measuring the ambient temperature, a timer as well as a linear measuring transducer. For monitoring the joining operation and the cooling operation, it is proposed to fix a predetermined cooling period on the basis of the measured ambient temperature. In the sense of the teaching of that invention, that predetermined time period has to pass before the parts welded together are cooled down to such a degree that the welding seam has a sufficient strength so that the parts can be removed from the clamping mechanism. The timer authoritative for the cooling period is started as soon as it has been detected, by means of the afore mentioned linear measuring transducer, that the end of the pipes have moved one against the other one by a certain amount. By means of this relative movement, it should be made sure that a mutual penetration of the ends of the pipes has taken place and that an effective welding is ensured. Even if the ambient temperature is the relevant parameter for detecting the reach of the strength of the welded parts, is not further specified in that publication how and in which position the sensor shall be arranged at welding machine in order to monitor the ambient temperature as exactly as possible.

OBJECT OF THE INVENTION

Starting from the above mentioned prior art, it is an object of the invention to provide an apparatus and a method for butt welding of articles made of thermoplastic material in which the ambient temperature can be measured as exactly as possible in order to optimize the cooling time.

SUMMARY OF THE INVENTION

In order to achieve this and other objects, the invention provides, according to a first aspect, an apparatus for butt welding of articles made of thermoplastic material which comprises a clamping mechanism for holding in place in coaxial relationship the two articles to be welded together. For heating the ends of the two articles to be welded together, a heating apparatus is provided.

An electronic control unit includes a temperature sensor for monitoring the ambient temperature, whereby the temperature sensor is mounted on the butt welding apparatus itself, but is thermally insulated from the butt welding apparatus.

According to a second aspect, the invention provides a method for butt welding of articles made of thermoplastic material by means of a butt welding apparatus which comprises a clamping mechanism for holding in place in coaxial relationship the two articles to be welded together. For heating the ends of the two articles to be welded together, a heating apparatus is provided.

An electronic control unit includes a temperature sensor for monitoring the ambient temperature, whereby the temperature sensor is mounted on the butt welding apparatus itself, but is thermally insulated from the butt welding apparatus.

In the method of the invention, the temperature value delivered by the temperature sensor is continuously monitored, and the cooling time of the articles to be welded together is determined under consideration of that temperature value.

BRIEF DESCRIPTION OF THE DRAWINGS

In the following, an embodiment of the apparatus and the method according to the invention will be further described, with reference to the accompanying drawings, in which.

DETAILED DESCRIPTION OF THE INVENTION

Known apparatuses for welding thermoplastic pipes usually control the joint pressure during the cooling phase. However, in the meantime, it was found that the real criterion for the end of the cooling phase is the strength of the welding zone. However, the strength is not strictly dependent on the time, but on the temperature of the material to be welded. At an ambient temperature of 40° C., the temperature of the material, after a given cooling period, is more than 30° C. higher than at a welding operation performed under identical conditions, but at an ambient temperature of 5° C.

Thus, within the scope of the present invention, it is suggested to monitor the real ambient temperature by means of a thermal sensor. By means of exactly monitoring the ambient temperature, the length of the cooling period can then be controlled such that the required strength of material in the welding zone is ensured.

However, there is a danger that a wrong ambient temperature is measured if the thermal sensor is placed in an unfavorable location. The placement of the sensor is important insofar as, on the one hand, the entire apparatus heats up and, on the other hand, the danger exists that the thermal sensor is heated up by the heating apparatus in an undesired way. Finally, a further danger can be seen in the fact that the thermal sensor is heated up via its connection wires.

Figure 1:
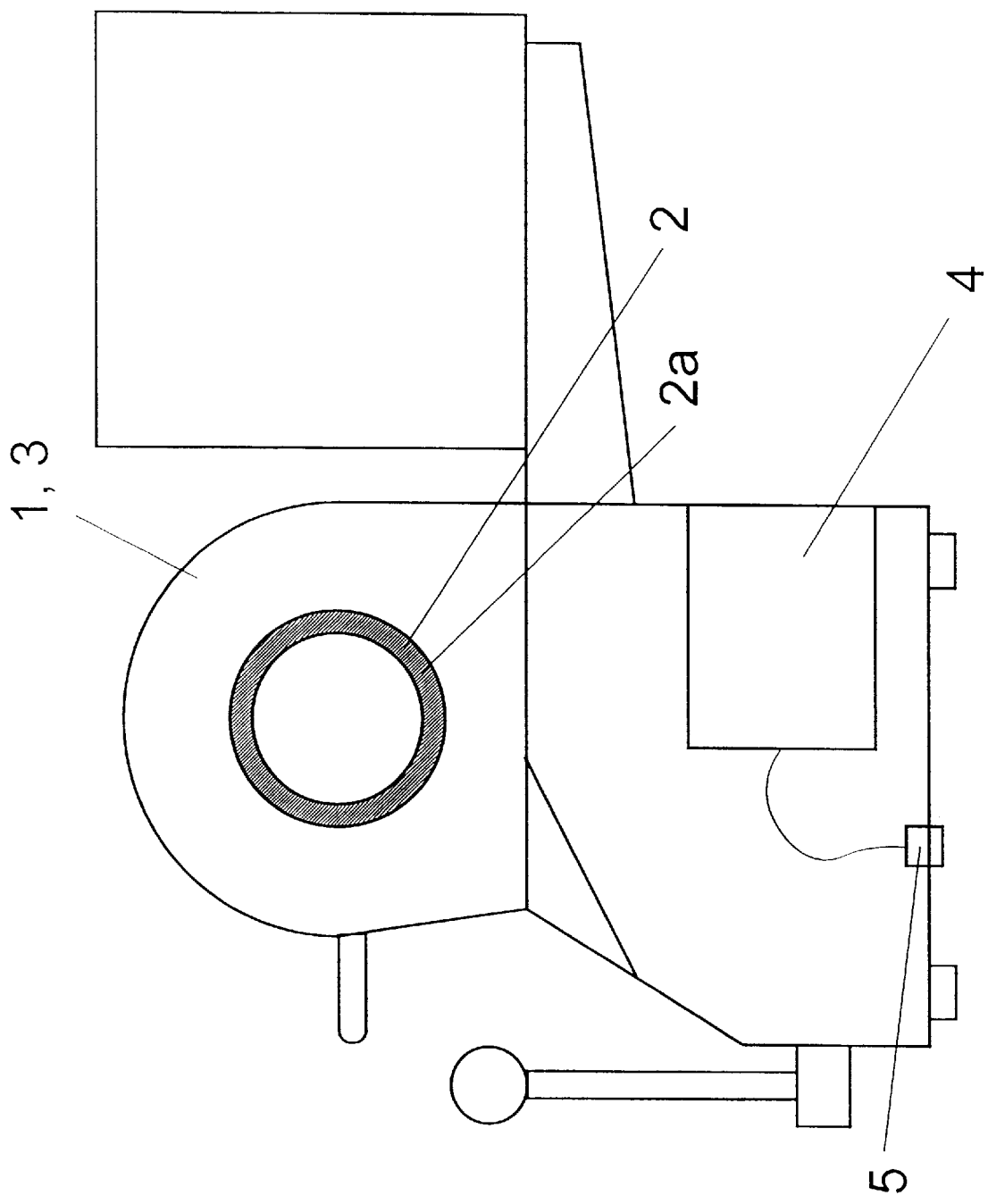
FIG. 1 a schematic cross sectional view of a butt welding apparatus according to the invention.

FIG. 1 shows a cross sectional view of a schematically illustrated apparatus 1 for welding together plastic pipes made of thermoplastic material along the joint location of the pipe ends 2 to be connected to each other. The joint area is designated with reference numeral 2a. Each of the pipes are clamped into a clamping mechanism 3 of a conventional welding machine. After the heating up phase having been finished, for example by means of a heating plate member movable between the two pipe ends and back,—the heating plate member being not shown for clarity—, the ends of the pipes are pressed together and the cooling phase initiated. A sensor member 5 for measuring the ambient temperature is then activated by means of a schematically shown control unit 4. The ambient temperature is continuously monitored and the length of the cooling period is calculated according to the formula $t_K=f(T_{RT})$, whereby $t_K$ means the length of the cooling period and $T_{RT}$ represents the ambient temperature. The calculation factors take into account the most unfavorable conditions with static ambient atmosphere.

Due to the fact that ambient temperature is considered as static, a material strength in the welding zone is ensured which surpasses by far the minimum material strength of the admissible field of application of the piping.

Figure 2:
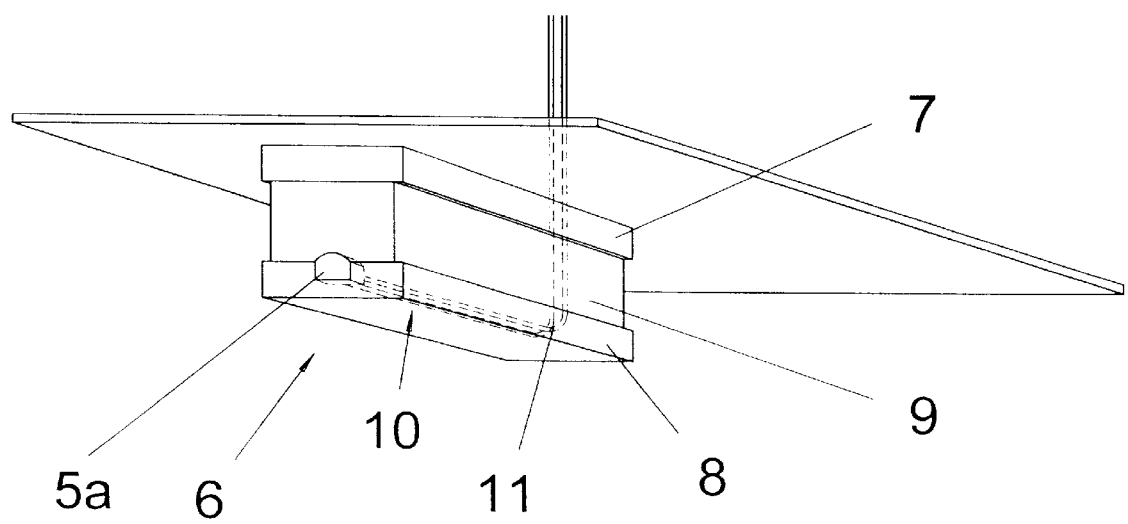
FIG. 2 a view of a thermal sensor arranged on a schematically shown intermediate element.

FIG. 2 schematically shows a thermal sensor 5a that is arranged at the bottom of the housing of the welding apparatus by means of an intermediate member 6, preferably in a region remote from the real heating element. The intermediate element 6 consists of an upper metallic plate member 7 and a lower metallic plate member 8 which both are interconnected by means of a thermal isolator member 9. As a thermal insulator member 9, a foam material with closed micro cells, preferably microcellular rubber is used.

The lower metallic plate member 8 is provided with a recess 10 in which the thermal sensor 5a is received. In order to avoid a heating up of the thermal sensor 5a via its connection wires 11, the connection wires 11 are in thermal contact with the lower metallic plate member 8. Preferably, for this purpose, a groove is machined into the lower metallic plate member 8 into which the connection wires 11 can be embedded. Due to such a design, the intrinsic temperature of the thermal sensor 5a does not raise considerably above the ambient temperature, even of the butt welding apparatus is in continuous use.

The correct function of the thermal sensor 5a is monitored by means of the electronic control unit 4. In the case that the thermal sensor 5a becomes defective, the calculation of the length of the cooling period on the basis of the worst case, i.e. high ambient temperature. Simultaneously, the defect of the thermal sensor is displayed to the user.

Figure 3:
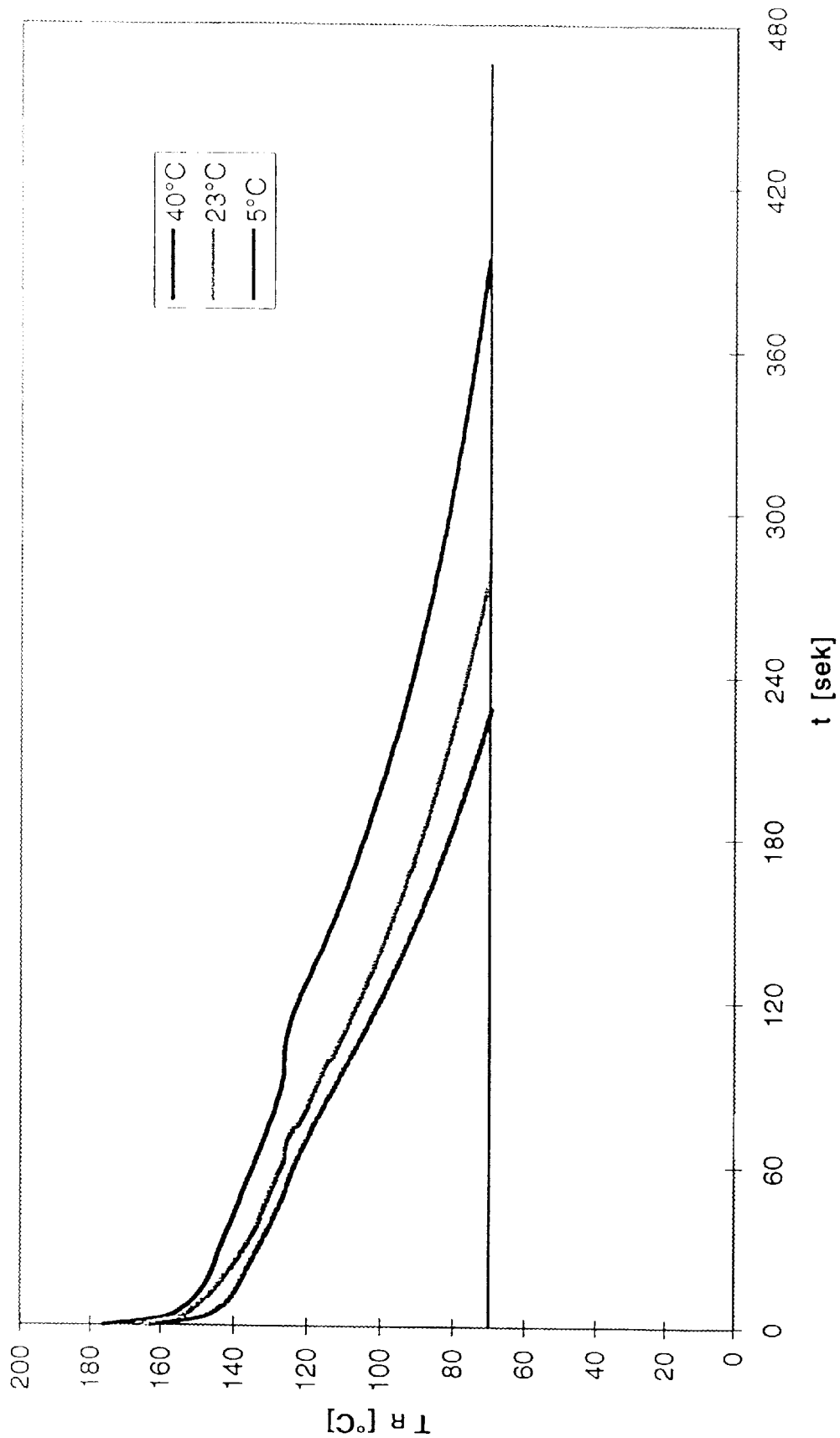
FIG. 3 a temperature-time-diagram.

In FIG. 3, different cooling down traces are illustrated. At an ambient temperature of 40° C., a cooling period with a length of appr. 400 sec. results; at an ambient temperature of 23° C., the required strength of the material is reached already after appr. 290 sec., and at an ambient temperature of 5° C., the cooling period is finished after appr. 230 sec.

What is claimed is:

1. An apparatus for butt welding of articles made of thermoplastic material, comprising:

a housing having an external surface;

a means for holding in place in coaxial relationship the two articles to be welded together;

a heating means for heating the two articles to be welded together;

an electronic control unit;

a temperature sensor means for monitoring the ambient temperature, said temperature sensor means being connected to said electronic control unit by connecting wires;

said temperature sensor means being positioned in an intermediate member mounted on the external surface of the housing of said butt welding apparatus, said temperature sensor means being thermally insulated from said housing, said means for holding, said heating means and said electronic control unit of said butt welding apparatus by a thermal insulating member between said temperature sensor means and said external surface of said butt welding apparatus.

2. An apparatus according to claim 1 in which said temperature sensor means is mounted on said housing of said butt welding apparatus in a region thereof which is remote from said heating means.

3. An apparatus according to claim 1 wherein said intermediate member for receiving said temperature sensor means comprises a thermal insulating member and a first metallic plate member connected thereto, whereby the connecting wires of said thermal sensor means are thermally connected to said first metallic plate member.

4. An apparatus according to claim 3 in which said first metallic plate member includes a recess in which said temperature sensor means is received.

5. An apparatus according to claim 3 in which said thermal insulating member consists of a foam material made of closed micro cells.

6. An apparatus according to claim 5 in which said foam material is micro cellular rubber.

7. An apparatus according to claim 5 in which said foam material is expanded rubber.

8. An apparatus according to claim 5 in which said electronic control unit includes means for activating said temperature sensor.

9. An apparatus according to claim 3 in which said intermediate member comprises a second metallic plate member that is connected to said thermal insulating member on a side opposite that of said first metallic plate member, said second metallic plate member secures said intermediate member to said butt welding apparatus.

10. A method of butt welding articles made of a thermoplastic material by means of an apparatus comprising a housing having an external surface, a means for holding in place in coaxial relationship two articles to be welded together, a heating means for heating the two articles to be welded together, an electronic control unit, and a temperature sensor means for monitoring ambient temperature electronically connected to said control unit, said temperature sensor means is mounted on the external surface of the housing of said butt welding apparatus, and is thermally insulated from said housing, said means for holding, said heating means and said electronic unit of said butt welding apparatus, said method comprising the steps of continuously monitoring the temperature value delivered by said temperature sensor means by said electronic control unit and determining the cooling time of the articles to be welded together as a function of the monitored temperature value.

11. A method according to claim 10 in which the temperature of the static ambient air is monitored.

12. A method according to claim 10 in which the heating of the articles to be welded together is performed by contact heating or touchless heating.

13. A method according to claim 10 in which said temperature sensor means is controlled by said electronic control unit to sense a possible defect whereby, in the case of a defect, the calculation of the cooling time is based on worst case scenario.

14. A method according to claim 13 in which the recognition of a defect of the temperature sensor means is displayed to the operator.

* * * * *